United States Patent [19]

Ferrigno et al.

[11] Patent Number: 5,735,044
[45] Date of Patent: Apr. 7, 1998

[54] LASER SHOCK PEENING FOR GAS TURBINE ENGINE WELD REPAIR

[75] Inventors: Stephen J. Ferrigno, Cincinnati; William D. Cowie, Xenia; Seetharamaiah Mannava, Cincinnati, all of Ohio

[73] Assignee: General Electric Company, Cincinnati, Ohio

[21] Appl. No.: 571,048

[22] Filed: Dec. 12, 1995

[51] Int. Cl.$^6$ .................................................. B23P 15/00
[52] U.S. Cl. .................................. 29/889.1; 29/889.72
[58] Field of Search .......................... 29/889.1, 889.7, 29/889.72; 416/241 R

[56] References Cited

U.S. PATENT DOCUMENTS

| | | |
|---|---|---|
| 1,763,256 | 6/1930 | Ray . |
| 3,850,698 | 11/1974 | Mallozzi et al. . |
| 4,002,403 | 1/1977 | Mallozzi et al. . |
| 4,060,769 | 11/1977 | Mallozzi et al. . |
| 4,155,152 | 5/1979 | Cretella et al. . |
| 4,214,355 | 7/1980 | Zelahy . |
| 4,219,592 | 8/1980 | Anderson et al. . |
| 4,247,254 | 1/1981 | Zelahy . |
| 4,291,448 | 9/1981 | Cretella et al. . |
| 4,401,477 | 8/1983 | Clauer et al. . |
| 4,411,597 | 10/1983 | Koffel et al. . |
| 4,426,867 | 1/1984 | Neal et al. . |
| 4,449,714 | 5/1984 | Meier . |
| 4,726,104 | 2/1988 | Foster et al. . |
| 4,739,146 | 4/1988 | Lindland et al. . |
| 4,764,089 | 8/1988 | Strangman . |
| 4,878,953 | 11/1989 | Saltzman et al. . |
| 4,937,421 | 6/1990 | Ortiz, Jr. et al. . |
| 4,995,087 | 2/1991 | Rathi et al. . |
| 4,998,005 | 3/1991 | Rathi et al. . |
| 5,113,582 | 5/1992 | Monson et al. ............... 29/889.1 |
| 5,127,019 | 6/1992 | Epstein et al. . |
| 5,131,957 | 7/1992 | Epstein et al. . |
| 5,142,778 | 9/1992 | Smolinski et al. . |
| 5,160,822 | 11/1992 | Aleshin . |
| 5,192,625 | 3/1993 | Fishman . |
| 5,210,944 | 5/1993 | Monson et al. ............... 29/889.1 |
| 5,245,155 | 9/1993 | Pratt et al. . |
| 5,268,045 | 12/1993 | Clare . |
| 5,269,857 | 12/1993 | Ganesh et al. . |
| 5,280,849 | 1/1994 | Galanes et al. ............... 29/889.1 |
| 5,306,360 | 4/1994 | Bharti et al. . |
| 5,312,650 | 5/1994 | Dalal et al. . |

FOREIGN PATENT DOCUMENTS 0 085 278  8/1983  European Pat. Off. .

OTHER PUBLICATIONS

"Laser shocking extends fatigue life", by John A. Vaccari, in American Machinist, A Penton Publication, Jul. 1992, pp. 62–64.

"Laser Shock Processing Increases the Fatigue Life of Metal Parts", Materials and Processing Report, Sep. 1991, pp. 3–5.

Primary Examiner—Irene Cuda
Attorney, Agent, or Firm—Andrew C. Hess; Nathan D. Herkamp

[57] ABSTRACT

A crack weld repair and method, particularly, for a gas turbine engine blade or other metallic component in the engine, providing a metallic substrate, a metallic filler bonded onto a substrate bond surface on the metallic substrate, and a region having deep compressive residual stresses imparted by laser shock peening extending into the substrate beneath the substrate bond surface. One embodiment provides a laser shock peened surface below the weld material filled void in a damaged area of the component forming a region of deep compressive residual stresses imparted by laser shock peening (LSP) extending from the laser shock peened surface into the component. Optionally, the surface over the repaired area of the weld filled void may also be laser shock peened forming a second region of deep compressive residual stresses imparted by laser shock peening (LSP) extending from the laser shock peened surface into the weld repair. Another embodiment provides a weld buildup tip overlay on a substrate bond surface of an airfoil tip having a laser shock peened region beneath the substrate bond surface.

10 Claims, 3 Drawing Sheets

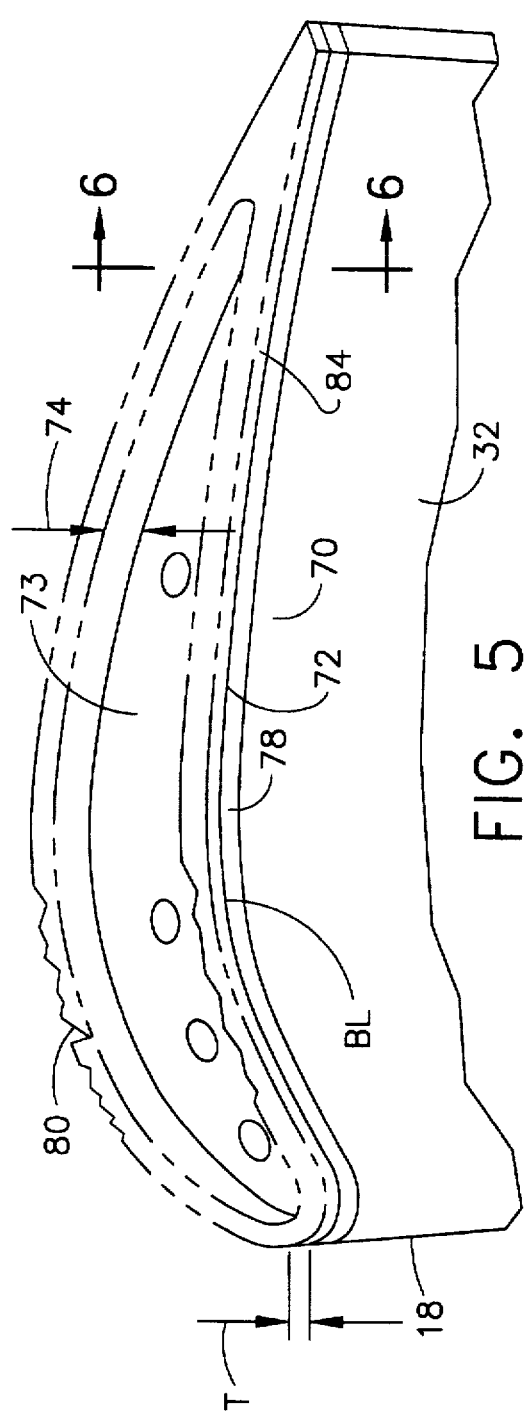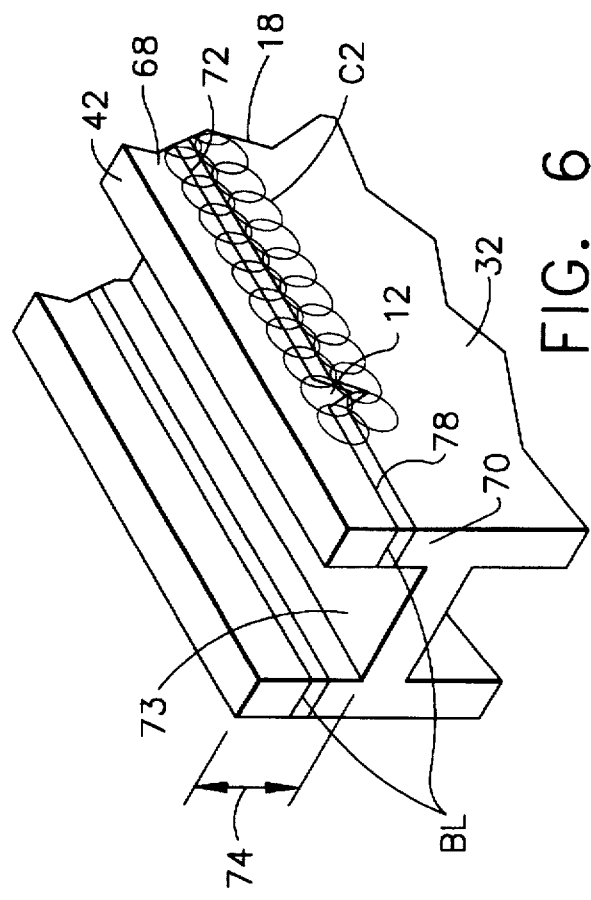

LASER SHOCK PEENING FOR GAS TURBINE ENGINE WELD REPAIR

RELATED PATENT APPLICATIONS

The present application deals with related subject matter in U.S. patent application Nos.: 08/319,346, entitled "LASER SHOCK PEENED ROTOR COMPONENTS FOR TURBOMACHINERY," filed Oct. 6, 1994, now U.S. Pat. No. 5,492,447, issued Feb. 20, 1996; 08/373,133, entitled "LASER SHOCK PEENED GAS TURBINE ENGINE FAN BLADE EDGES," filed Jan. 17, 1995, now U.S. Pat. No. 5,591,009; 08/362,362, entitled "ON THE FLY LASER SHOCK PEENING," filed Dec. 22, 1994; 08/399,285, entitled "LASER SHOCK PEENED GAS TURBINE ENGINE COMPRESSOR AIRFOIL EDGES," filed Mar. 6, 1995, now abandoned; 08/399,320, entitled "LASER SHOCK PEENING SURFACE ENHANCEMENT FOR GAS TURBINE ENGINE HIGH STRENGTH ROTOR ALLOY REPAIR," filed Mar. 6, 1995, now U.S. Pat. No. 5,525,429, issued Jun. 11, 1996; and 08/399,321, entitled "LASER SHOCK PEENING FOR GAS TURBINE ENGINE VANE REPAIR," filed Mar. 6, 1995, now U.S. Pat. No. 5,584,662.

BACKGROUND OF THE INVENTION

1. Field of the Invention

This invention relates to gas turbine engine turbine weld repair such as for turbine blade tip and platform crack repairs using welding to build up tips and fill and repair deep turbine blade tip cracks by forming a region below the weld having localized compressive residual stresses imparted by laser shock peening.

2. Description of Related Art

A gas turbine engine includes a compressor section, a combustion section and a turbine section. Disposed within the turbine section are alternating annular stages of circumferentially disposed moving blades and stationary vanes. The rows or stages of vanes and blades are concentrically located about a center-line axis of the gas turbine engine. The blades are typically mounted on a disk which rotates about its central axis though integrally formed disks and blades referred to as BLISKS in the industry may also be used. Hot combustion gases exit the combustor and pass through the turbine section, whereupon the blades which are mounted on the disks rotatably drive a shaft, thus, providing shaft work for driving the fan and compressor sections and auxiliary systems. Higher gas temperatures allow more work to be extracted from the gases in the turbine section, thus, increasing the overall efficiency of the gas turbine engine.

The stationary vanes disposed between the stages of moving blades stabilize and direct the gas flow from one stage of rotating turbine blades to the next stage of rotating turbine blades. The stabilization and turning of the gas flow optimizes the amount of work extracted from the hot gases in the turbine section. It is very important to the efficient operation of the turbine vanes and engine to maintain the structural integrity of the nozzle and, in particular, the nozzle flow areas which are the spaces between adjacent vanes in a vane stage. Cobalt and nickel-base superalloy materials have been developed to provide mechanical strength at high temperatures so that the operating temperature capability of the turbine blades and vanes is increased over the operating temperatures of prior designs. It is known to cast engine blades and vanes from superalloys, for example, a nickel-base alloy or a cobalt-base alloy. Nickel-base superalloys are frequently primarily strengthened by precipitation of a gamma prime phase, Ni3 (Al, Ti) when used in gas turbine engines and, in particular, in turbine vanes. In addition, the casting of turbine vanes and blades is frequently performed so as to produce a directionally solidified part, with grains aligned parallel to the axis of the blade or vane or a single crystal part with no grain boundaries.

In service, damage and deterioration of the turbine blade and vane surface occurs due to oxidation, thermal fatigue cracking and metal erosion caused by abrasives and corrosives in the flowing gas stream. During periodic engine overhauls, the blades and vanes are inspected for physical damage and measured to determine the degree of flow area change and the effect on nozzle flow area. Before these blades and vanes are returned to the engine physical damage is usually repaired or the blades and/or vanes replaced.

Several methods exist for repairing the worn or damaged turbine blades and vanes. Repair methods include, for example, conventional fusion welding, plasma spray as described in U.S. Pat. No. 4,878,953, and the use of a tape or slurry material containing a mixture of a binder and a metal alloy powder which is compatible with the substrate alloy. U.S. Pat. No. 4,878,953 provides an excellent source of background information related to methods for refurbishing cast gas turbine engine components and particularly for components made with nickel-base and cobalt-base superalloys for use in the hot sections of gas turbine engines and, more particularly, for components exposed to high temperature operating conditions.

Hollow, air cooled blades and vanes are commonly used in modern gas turbine engines. These components have an internal cavity through which air flows during engine operation. This air is discharged through holes, called cooling holes, which are present in the airfoil section and sometimes present in the platform and tip. See, e.g., commonly assigned U.S. Pat. No. 4,474,532 to Pazder. The passage of air through and over the blade or vane extracts heat from the component surface allowing use of the component even when the gas stream temperature exceeds the melting temperature of the alloy from which it is made. U.S. Pat. No. 4,726,104, entitled "Methods for Weld Repairing Hollow, Air Cooled Turbine Blades and Vanes" discloses prior art methods for weld repairs of air cooled turbine blade tips including squealer tips.

Some gas turbine engines are designed so, that during engine operation, the tip portion of the rotating blades rubs a stationary seal and limits the leakage of working medium gases in the axial flow direction. While the seals are usually more abradable than are the blade tips (so that during such rub interactions, a groove is cut into the seal), the blade tips do wear and the blades become shorter. As the blades accumulate service time, the total tip wear increases to the point that eventually, the efficiency of the blade and seal system is reduced and cracks may appear in the blades especially at the blade tips such that the blades need to be repaired or replaced. Repairing is much cheaper and more desirable.

The tips of worn blades can be repaired, and the length of the blade increased, by mechanically removing, such as by grinding down, the worn and/or damaged tip area and then adding weld filler metal to the tip to build up the tip to a desired dimension using any of several well known welding techniques (typically arc welding techniques) known to those skilled in the art. During such a weld repair operation cracks near cooling holes near the blade may also be repaired by welding. Larger or deeper cracks near the tip which are not ground down can be filled by welding.

When an engine is overhauled, these components are either replaced by new parts, which is very expensive, or repaired, which is clearly more desirable if a cost savings may be achieved. Several methods have been devised in which a metal overlay is deposited by spraying or welding metal metallic filler onto a substrate to form or dimensionally restore gas turbine component such as an airfoil and, more particularly, a blade tip such as a turbine blade airfoil squealer tip. The mechanical properties of such deposited layers of material have been in general much poorer than those of the corresponding wrought and or cast material. Similar methods are used to restore damaged or worn metal articles but, in this case, there is an additional problem in that the air plasma thermal metallic spray process causes low cycle fatigue life loss in the substrate below the deposited layer. This degrades the effectiveness of the repair.

To this end, a number of repair methods have been developed utilizing air plasma thermal metal spraying, brazing and welding for dimensional restoration. These processes are most suitable for providing relatively thin coatings. Problems and difficulties occur when these processes are used to repair relatively larger geometric dimensions. Air plasma thermal metal spraying and build up by welding produces overlays that are mechanically bonded to substrates. These overlays do not have the structural integrity of the original forged or cast component and potentially degrade the fatigue life of the substrate. The bond between the overlay and substrate suffers due to thermally induced stresses during the welding. Thus, even though present dimensional restoration processes are satisfactory for many repairs, it is highly desirable to provide better repairs that do not degrade the low cycle fatigue properties of the parent metal substrate. It is also highly desirable to provide such a repair with a higher mechanical bond strength between the overlay and the substrate than is presently available with conventional techniques.

One repair method, disclosed in U.S. Pat. No. 4,878,953, entitled "Method of Refurbishing Cast Gas Turbine Engine Components and Refurbished Component", provides a source of background information related to methods for refurbishing cast gas turbine engine components and, particularly, for components made with nickel-base, cobalt-base and iron-base superalloys for use in the hot sections of gas turbine engines and, more particularly, for components exposed to high temperature operating conditions. U.S. Pat. No. 4,224,356, entitled "Deposition of Metals on a Base" discloses prior art methods for improving mechanical properties of a deposited metal by subjecting it to peening after deposition by bombarding the metal surface with relatively hard shot, thereby, effecting a cold working of the metal in the surface region thereof. Among the disadvantages noted by the inventor are internal compressive stresses, which are generated by the cold working action of the subsequent peening and, therefore, the patent suggests simultaneously spray depositing metal onto a substrate, whilst at the same time bombarding the deposit with hard rounded particles, so that the deposit is hot plastically deformed as it is being built up in order to provide "greatly enhanced physical and mechanical properties". This method involves complex and expensive equipment and processes.

The present invention is directed at all of the concerns and disadvantages noted above for using build up welding and air plasma metal spray or deposition on a substrate of a metallic component in order to build up the component or to provide dimensional restoration. The present invention provides a dimensional restoration method and article, and gas turbine engine rotor component in particular, having a substrate with regions of deep compressive residual stresses imparted by laser shock peening over an area of the substrate upon which at least one layer of metal is deposited by air plasma or other metal spraying method.

Cracking resulting from high thermal stresses and oxidation have conventionally been repaired with a wide gap braze or weld alloy. One particular exemplary repair method provides for filling cracks which can be as long as approximately 1.5" and as wide as approximately 0.050" in order to refurbish vanes in this manner. Trailing edges, in particular, are subjected to the most severe conditions, so much so, that vanes can be returned from the field with missing portions of trailing edges and in many cases vanes are considered unrepairable. The HPT vane materials for the latest engines require high strength oxidation resistant single crystal and directionally solidified cast alloys. The current wide gap braze repair system for repairing vanes made of these alloys and by single crystal processes do not restore all of the these properties in the repaired areas of the vane. Further, life enhancement of the repair and vane at a low cost is therefore highly desirable. Vane replacement is very costly and there is always a need for stronger, longer lasting, and more cost effective blade and vane repairs. It is very desirable to provide life extension of the blades and vanes and other repairs which would further approach single crystal properties, offer wider repairability limits, and make available repairs on hardware currently considered unrepairable because of excessive damage.

The present invention is further directed towards this end and provides a crack weld and braze repair, particularly, for a gas turbine engine blade or vane, with regions of deep compressive residual stresses imparted by laser shock peening the area beneath the filler and also over the filler or repair.

The region of deep compressive residual stresses imparted by laser shock peening of the present invention is not to be confused with a surface layer zone of a work piece that contains locally bounded compressive residual stresses that are induced by a hardening operation using a laser beam to locally heat and thereby harden the work piece such as that which is disclosed in U.S. Pat. No. 5,235,838, entitled "Method and Apparatus for Truing or Straightening Out of True Work Pieces". The present invention uses multiple radiation pulses from high power pulsed lasers to produce shock waves on the surface of a work piece similar to methods disclosed in U.S. Pat. No. 3,850,698, entitled "Altering Material Properties"; U.S. Pat. No. 4,401,477, entitled "Laser Shock Processing"; and U.S. Pat. No. 5,131, 957, entitled "Material Properties". Laser peening, as understood in the art and as used herein, means utilizing a laser beam from a laser beam source to produce a strong localized compressive force on a portion of a surface. Laser peening has been utilized to create a compressively stressed protection layer at the outer surface of a workpiece, which is known to considerably increase the resistance of the workpiece to fatigue failure as disclosed in U.S. Pat. No. 4,937, 421, entitled "Laser Peening System and Method". However, the prior art does not disclose wide gap braze repairs of the type claimed by the present patent nor the methods of how to produce them. It is to this end that the present invention is directed.

SUMMARY OF THE INVENTION

The present invention is a repaired gas turbine engine component and a repair process that provides a metallic substrate, a metallic filler bonded onto a substrate bond surface on the metallic substrate, and a region having deep compressive residual stresses imparted by laser shock peening extending into the substrate beneath the substrate bond surface.

One particular embodiment of the present invention provides a metallic crack weld or braze repair for a metallic body, particularly, for a gas turbine engine blade, vane or other component of the engine. The repair is characterized by a weld or braze filled void in a damaged area of the component, a laser shock peened surface beneath the filled void, and a region of deep compressive residual stresses imparted by laser shock peening (LSP) extending from the laser shock peened surface into the metallic body. Another embodiment provides a second laser shock peened surface extending at least in part over an exterior surface area of the filled void such that the second laser shock peened region having deep compressive residual stresses imparted by laser shock peening extends into the filled void.

Another embodiment of the present invention is a gas turbine engine metallic airfoil having a pressure side, a suction side, and a radially outer tip extending chordwise between a leading edge and a trailing edge of the airfoil. The tip has an overlay portion bonded on a substrate portion and the substrate portion has a region of deep compressive residual stresses imparted by laser shock peening (LSP) extending into the substrate portion from a laser shock peened surface between the overlay portion and the bonded substrate portion.

The present invention also includes a method of making such repaired components.

ADVANTAGES

One major advantage of the present invention is an excellent wear resistant bond that has reduced thermally induced stresses along the bond between the overlay and substrate which is caused by welding and other thermal overlay processes. Among the advantages provided by the present invention is the improved ability to better extend the useful life of crack repaired gas turbine engine parts, particularly, that of turbine blades and vanes, as compared to currently available methods. Another advantage of the present invention is that it reduces engine component and, in particular, gas turbine engine blade and vane, replacement which is very costly. The present invention provides component blade and vane repairs with material properties such as strength and heat resistance which more closely approach those of original manufactured parts. The present invention also offers wider repairability limits and makes available repairs on hardware currently considered unrepairable because of excessive damage.

BRIEF DESCRIPTION OF THE DRAWINGS

The foregoing aspects and other features of the invention are explained in the following description, taken in connection with the accompanying drawings where:

FIG. 5 is a perspective illustrative view of a weld built up tip on the turbine blade in FIG. 1.

FIG. 6 is a blown up portion of the perspective illustrative view of a weld built up tip on the turbine blade in FIG. 5 further showing a repaired crack in accordance with the present invention.

DETAILED DESCRIPTION OF THE INVENTION

Figure 1:
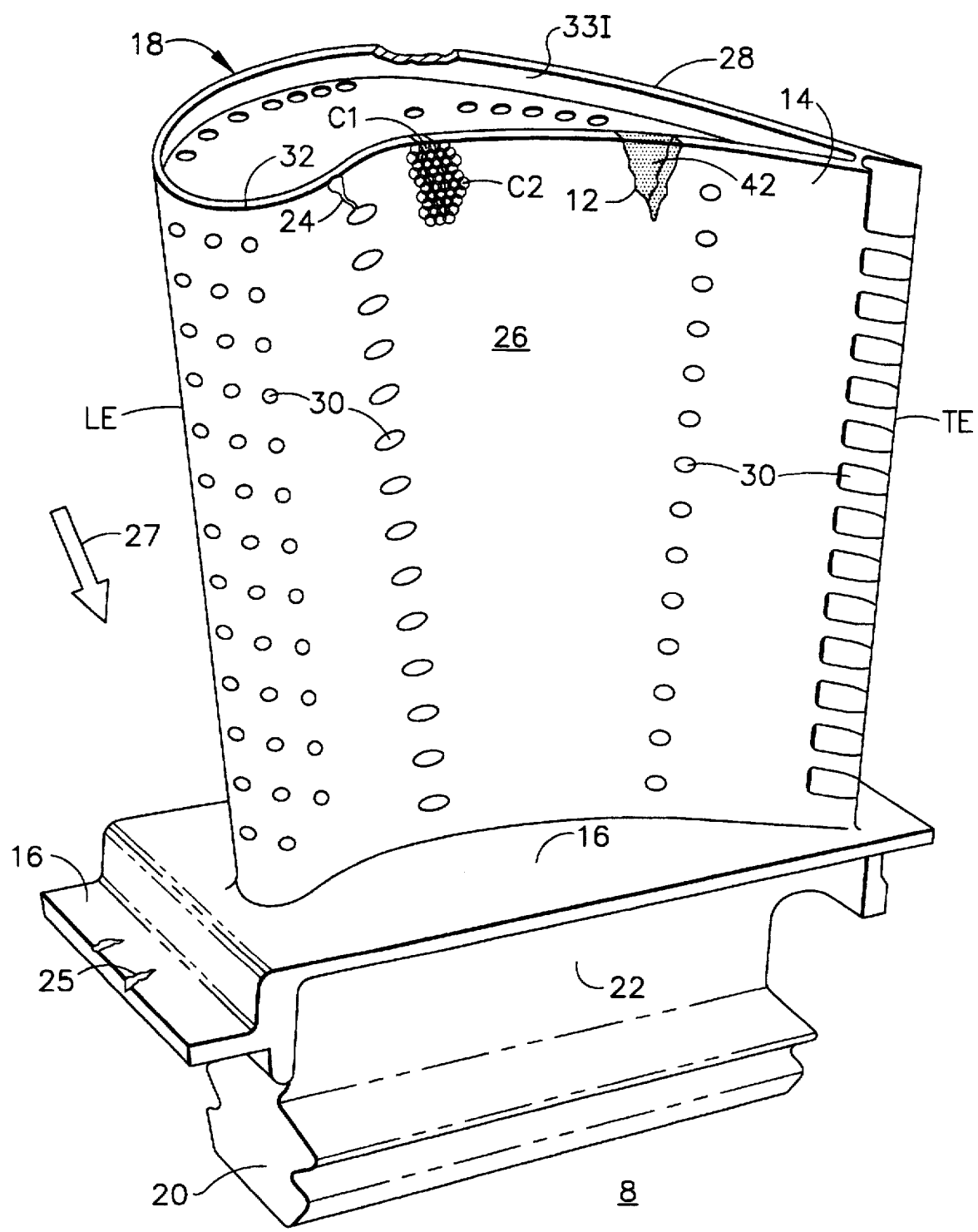
FIG. 1 is a perspective illustrative view of an exemplary aircraft gas turbine engine turbine blade in accordance with the present invention.

Illustrated in FIG. 1 is a turbine blade 8 which is typically circumscribed by a shroud (not shown) against which it seals and is illustrated as having a squealer type tip 18 that is often used in the high pressure turbines. The turbine blade 8 includes an airfoil 14 extending radially outward from a blade platform 16 to the blade tip 18. The turbine blade 8 includes a root 20 connected to the platform 16 to by a blade shank 22. The airfoil 14 includes a pressure side 26, facing in the general direction of rotation as indicated by an arrow 27, and a suction side 28. Cooling holes 30 are disposed through an outer wall 32 of the turbine blade 8 on its leading edge LE, trailing edge TE, and the pressure and suction sides 26 and 28, respectively.

Figure 2:
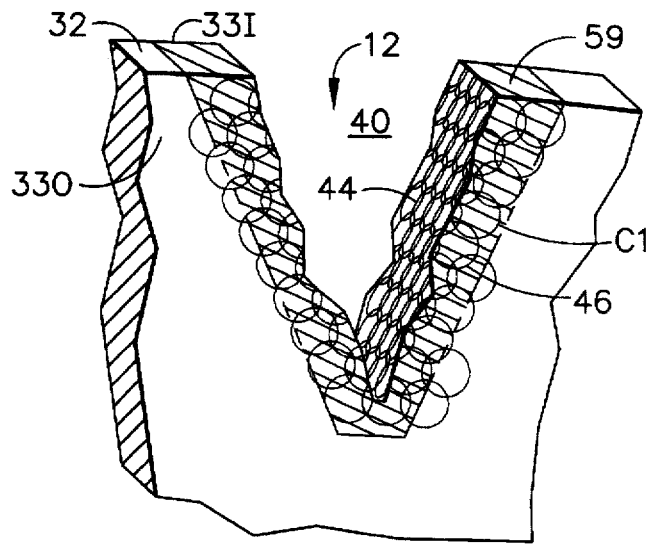
FIG. 2 is a cross-sectional illustrative view of a tip of the turbine blade in FIG. 1 showing a partially repaired crack in accordance with the present invention.
Figure 3:
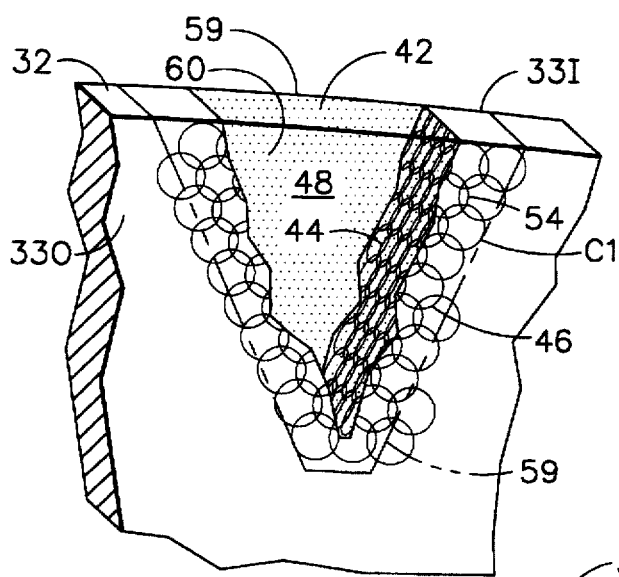
FIG. 3 is a cross-sectional view of the partially repaired crack in FIG. 2 illustrating a further step in the repair of the crack in accordance with the present invention.
Figure 4:
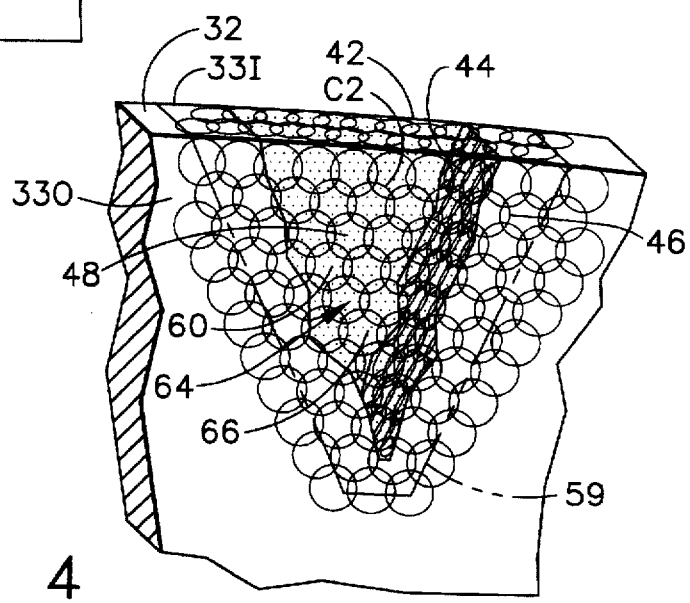
FIG. 4 is a cross-sectional view of the repaired crack in FIG. 3 illustrating a further step in the repair of the crack in accordance with an alternative embodiment of the present invention.

The turbine blade 8 rubs on the shroud causing tip damage in the form of blade tip cracks 12 shown filled with a filler in the form of a metallic weld material 42 in accordance with the present invention. Cooling hole cracks 24 and blade platform cracks 25 also form due to normal wear and engine usage. All of these types of cracks have been and continue to be repaired by welding and brazing in other types of crack repairs for gas turbine engine components. These repairs are generally done by filling the an empty void 40, illustrated in FIG. 2, of each of the cracks with the metallic weld material 42, illustrated in FIGS. 3 and 4, to produce a filled void 48 bonded to an inner crack surface 44. Often the crack surface 44 is prepared in some time consuming manner and the crack repair is subject to fatigue failure of portions of the filled void 48 often along the crack surface itself. The blade 8, as well as many other gas turbine components, is subject to extreme thermal cycling which causes thermal fatigue and oxidation damage generated during engine operation. These repairs, even when filled with the braze or weld material 42 are subject to thermal fatigue failure.

The present invention counters this fatiguing process by laser shock peening the crack surface 44 as well as the areas on an outer side 33O and preferably on an inner side 33I of the outer wall 32 at the tip 18 to form a laser shock peened surface 46 that includes all of the crack surface 44. The present invention produces laser shock peened surfaces, such as the laser shock peened surface 46, with laser beam induced shock waves generally indicated by overlapping laser shock peened circular spots indicated generally by a circle labelled C1 for a first set of circles or spots and C2 for a second set of circles or spots in FIGS. 2, 3 and 4 and, therefore, are referred to as laser beam shocked surfaces. The filled void 48 extending between surface areas of the metallic body, of the blade or other metallic component, that bounds the void is filled with a metallic repair material which is bonded to the laser shock peened surface 46 and indicated by the first set of circles C1. A corresponding first laser shock peened region 59 extends into the body from and bounds the filled void 48 and from the outer side 33O and the inner side 33I along the laser shock peened surface 46. The first laser shock peened region 59 has deep compressive residual stresses imparted by laser shock peening extending into the body from the laser shock peened surface 46. Even if the laser beam cant be directly impinged on the entire crack surface 44 the first laser shock peened region 59 will extend sufficiently into the body from the outer side 33O and the inner side 33I and beneath the inner crack surface 44 so as to bound the filled void 48 and provide the benefits of the present invention. This weld and repair process provides an improved bond between the braze or weld material 42 and the outer wall 32 of the turbine blade 8 or other component. Generally, the weld material 42 may be considered a metallic filler bonded onto a substrate bond surface, the crack surface 44, of the outer wall 32 which is a metallic substrate, and the first laser shock peened region 59 having deep compressive residual stresses imparted by laser shock peening extends into the substrate beneath the substrate bond surface. The first laser shock peened region 59 is formed prior to laser shock peening and therefore may equally be referred to as a pre-bond laser shock peened region.

It is well known in the art to construct gas turbine engine components such as the turbine blade 8 from Cobalt and nickel-base superalloy materials. The components are often cast with a process to produce directionally solidified components, with grains aligned parallel to the axis of the airfoil, or a single crystal component, with no grain boundaries. The weld material 42 or braze material is preferably also made of these alloys and the weld or braze repair does not restore all of the original properties, particularly single crystal and directionally solidified mechanical properties, in the repaired areas of the blade 8. Therefore, the present invention provides an alternative embodiment that is more particularly illustrated in FIG. 4. To counter the loss of material and process properties and capabilities the filled voids 48 are laser shock peened on their outside surfaces 60 forming a second outer laser shock peened surface 64 as indicated by second set of circles C2 and a second laser shock peened region 66 beneath it. This further strengthens the entire weld repair.

Laser beam shock induced deep compressive residual stresses are formed in compressive pre-stressed regions, such as the first laser shock peened region 59 and the second laser shock peened region 66, and generally have stress concentrations of about 50–150 KPSI (Kilo Pounds per Square inch) extending from the laser shock peened surfaces 46 to a depth of about 20–50 mils into these regions. The laser beam shock induced deep compressive residual stresses are produced by repetitively firing a high energy laser beam that is focused on laser shock peened surface which is covered with paint to create peak power densities having an order of magnitude of a gigawatt/cm$^2$. The laser beam is fired through a curtain of flowing water that is flowed over the laser shock peened surface which is painted and the paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Ablated paint material is washed out by the curtain of flowing water.

This and other methods for laser shock peening are disclosed in greater detail in U.S. patent application Nos. 08/319,346, entitled "LASER SHOCK PEENED ROTOR COMPONENTS FOR TURBOMACHINERY", 08/373, 133, entitled "LASER SHOCK PEENED FAN BLADE EDGES", 08/363,362, entitled "ON THE FLY LASER SHOCK PEENING", filed Dec. 22, 1994, U.S. patent application No. 08/399,285, "LASER SHOCK PEENED GAS TURBINE ENGINE COMPRESSOR BLADE EDGES", filed Mar. 6, 1995, and U.S. patent application No. 08/399, 321, entitled "LASER SHOCK PEENING FOR GAS TURBINE ENGINE VANE REPAIR", filed Mar. 6, 1995, all of which are incorporated herein by reference.

Another embodiment of the present invention is illustrated in FIG. 5 and 6 which depicts the metallic substrate as the tip 18 of the outer wall 32 of the turbine blade 8 upon which a metallic filler build up 68 is bonded onto a substrate bond surface, a prepared top surface 72 of the tip, on a metallic substrate 70. Typically, a weld material 42 is used to form the build up 68 and dimensionally restore the tip 18 substantially to its original height 74 as measured from a tip shelf 73. The present invention provides a laser shock region 78 having deep compressive residual stresses imparted by laser shock peening extending into the substrate 70 beneath the substrate bond surface, top surface 72. The airfoil has a damage 80 on the airfoil tip 18 wherein the damage is typically characterized by any or all of the following; tears, rolls, voids, and tip roughness in the material of the airfoil. The built up tip 18 is made by first mechanically removing a damaged layer 84 down to a circumscribing boundary line BL of the tip containing the damage 80 thereby forming the substrate surface, top surface 72, below the removed damaged layer, thus, forming the top surface. The top surface 72 is prepared by well known chemical means and mechanical means may also be used, such as a rotary steel brush, to remove oxides and foreign materials from the top surface 72 of the tip 18. The top surface 72 is then laser shock peened with the same process described above to form the laser shock peened region 78 beneath the surface area of the metallic substrate, the top surface 72, by using a laser beam with sufficient power to vaporize material on the surface area to form a region having deep compressive residual stresses imparted by the laser shock peening extending into the substrate from the laser shock peened surface. The metallic filler build up 68 is bonded onto a substrate bond surface, the top surface 72, which may be done by welding a metallic filler or weld material 42 onto the bond surface to build up and dimensionally restore the tip 18 substantially to its original height 74 as measured from a tip shelf 73. U.S. Pat. No. 4,474,532 to Pazder and U.S. Pat. No. 4,726,104, disclose several of the well known methods for build up repairs of air cooled turbine blade tips including squealer tips.

If the blade tip 18 has deep blade tip cracks 12 that are deeper than a thickness T of the removed layer then the previous method of filling the voids of the tip crack may be done before the weld build up to fill and repair the voids of the cracks. The cracks may also be prepared by well known chemical means and mechanical means to remove oxides and foreign materials from the bond surface of the voids. An outer surface of the tip including the built up tip with or without the filled void cracks may be further laser shock peened forming a second outer laser shock peened surface 64 as indicated by second set of circles C2 and a second laser shock peened region 66 beneath it. This further strengthens the entire weld repair.

While the preferred embodiment of the present invention has been described fully in order to explain its principles, it is understood that various modifications or alterations may be made to the preferred embodiment without departing from the scope of the invention as set forth in the appended claims.

We claim:

1. A method to repair damage in a gas turbine engine metallic component, said method comprising the following steps:

laser shock peening at least one surface area of the component forming a region having deep compressive residual stresses imparted by laser shock peening extending into a substrate beneath a substrate bond surface of the component, bonding a metallic filler onto the substrate.

2. A method as claimed in claim 1 wherein said damage is characterized by a void in the material of the component, said method further comprises the following steps:

forming the region having deep compressive residual stresses imparted by laser shock peening beneath a surface area substantially bounding the void, said laser shock peening step includes using a laser beam with sufficient power to vaporize material on a laser shock peened surface of the component to form the region having deep compressive residual stresses imparted by the laser shock peening extending into the component from the laser shock peened surface, flowing a curtain of water over the laser shock peened surface while the laser beam is firing until the laser shock peened surface is completely covered by laser beam spots at least once, and then filling the void with a suitable molten metallic material and letting the molten metallic material solidify.

3. A method as claimed in claim 1 further comprising laser shock peening another surface area that extends over the void filled with the molten metallic material by using a laser beam with sufficient power to vaporize material on the surface area that extends over the void to form a another region having deep compressive residual stresses imparted by the laser shock peening extending into the filled void from the laser shock peened surface area that extends over the void, flowing a curtain of water over the surface area that extends over the void while the laser beam is firing until the laser shock peened surface area that extends over the void is completely covered by laser beam spots at least once.

4. A method as claimed in claim 3 further comprising coating the laser shock peened surface and later on the surface area that extends over the void with the material to be vaporized on the surface areas prior to the laser beam firings wherein said material is a coating material suitable to generate a plasma which results in shock waves to form the regions having deep compressive residual stresses.

5. A method as claimed in claim 2 further comprising coating the laser shock peened surface with the material to be vaporized on the laser shock peened surface prior to the laser beam firings wherein the material is a coating material suitable to generate a plasma which results in shock waves that form the regions having deep compressive residual stresses.

6. A method as claimed in claim 2 wherein the gas turbine engine metallic component is a turbine blade having an airfoil that extends between a platform and a squealer tip, the squealer tip having a radially extending wall that circumscribes said airfoil at a radially outer end of the airfoil forming an open cavity within the wall, and the void is in a radially outer edge of the tip, said method comprising the following steps:

forming at least two regions having deep compressive residual stresses imparted by laser shock peening and which substantially bound the void, the regions extend into the component from respective inner and outer laser shock peened surfaces located along inner and outer sides of the wall with respect to the cavity, the regions extend to a surface area bounding the void, said laser shock peening step includes using two laser beams with sufficient power to vaporize material on the two laser shock peened surfaces of the component to form the respective regions having deep compressive residual stresses imparted by the laser shock peening extending into the component from the laser shock peened surfaces, flowing a curtain of water over the laser shock peened surface while the laser beam is firing until the laser shock peened surface is completely covered by laser beam spots at least once, and then filling the void including along the surface area of the component bounding the void the with a suitable molten metallic material and letting the molten metallic material solidify.

7. A method as claimed in claim 6 further comprising laser shock peening another surface area that extends over the void filled with the molten metallic material by using a laser beam with sufficient power to vaporize material on the surface area that extends over the void to form a another region having deep compressive residual stresses imparted by the laser shock peening extending into the filled void from the laser shock peened surface area that extends over the void, flowing a curtain of water over the surface area that extends over the void while the laser beam is firing until the laser shock peened surface area that extends over the void is completely covered by laser beam spots at least once.

8. A method as claimed in claim 7 further comprising coating the laser shock peened surface and later on the surface area that extends over the void with the material to be vaporized on the surface areas prior to the laser beam firings wherein said material is a coating material suitable to generate a plasma which results in shock waves to form the regions having deep compressive residual stresses.

9. A method as claimed in claim 1 wherein said component is an airfoil having a damaged airfoil tip wherein said damage is characterized by at least one of the following; tears, rolls, voids, and tip roughness in the material of the airfoil, said method comprising the following steps:

mechanically removing a layer of the tip containing the damage forming a substrate surface below the removed layer, laser shock peening the surface area of a metallic substrate below the substrate surface using a laser beam with sufficient power to vaporize material on the surface area to form a region having deep compressive residual stresses imparted by the laser shock peening extending into the substrate from the laser shock peened surface, and buildup a metallic filler tip overlay on the substrate surface by a thermal bonding process.

10. A method as claimed in claim 9 further comprising laser shock peening another surface area that extends over the tip overlay by using a laser beam with sufficient power to vaporize material on the surface area that extends over the void to form a another region having deep compressive residual stresses imparted by the laser shock peening extending into the filled void from the laser shock peened surface area that extends over the overlay and flowing a curtain of water over the surface area that extends over the void while the laser beam is firing until the laser shock peened surface area that extends over the overlay is completely covered by laser beam spots at least once.

* * * * *